D. F. WOODWARD.
Milk Cooler.
No. 104,392.  Patented June 14, 1870.
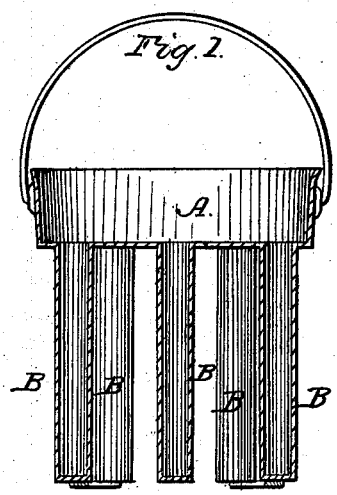
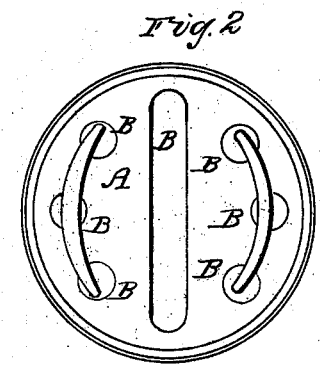
Witnesses
Harry King
C. L. Evert
Inventor
David F. Woodward
per Alexander Mason
Atty.

UNITED STATES PATENT OFFICE.

DAVID F. WOODWARD, OF JASPER, NEW YORK.

IMPROVEMENT IN MILK-COOLERS.

Specification forming part of Letters Patent No. 104,392, dated June 14, 1870.

*To all whom it may concern:*

Be it known that I, DAVID F. WOODWARD, of Jasper, in the county of Steuben, and in the State of New York, have invented certain new and useful Improvements in Milk-Coolers; and do hereby declare that the following is a full, clear, and exact description thereof, reference being had to the accompanying drawing, and to the letters of reference marked thereon, making a part of this specification.

The nature of my invention consists in the construction of a milk-cooler with a series of tubes of any desired shape extending downward from the bottom, for the purpose of cooling the milk.

In order to enable others skilled in the art to which my invention appertains to make and use the same, I will now proceed to describe its construction and operation, referring to the annexed drawing, in which—

Figure 1 is a longitudinal vertical section, and Fig. 2 is a bottom view, of my pail or cooler.

A represents a milk-cooler of any suitable dimensions, from the bottom of which pipes or tubes B B, of round, half-round, oblong, or any other shape, descend for any desired length, said tubes being all closed at their lower ends.

The milk is put into the cooler A and fills all the tubes, more or less, according to the quantity of milk, and then the cooler is placed in a vat or tub of cold water, and there remains until the milk is sufficiently cooled to set it for raising the cream or removing it to the cheese-factories.

By the arrangement of the tubes a large amount of surface is presented to the cooling effects of the water, and thereby cooling the milk in warm weather, so that the cream will commence rising as soon as it is strained, which will make a much better article of butter than it does where milk stands for some time before it arrives at the proper stage for the cream to rise.

This invention is intended for cooling the milk or taking the animal heat out before it is taken into the cellar, thereby leaving the cellar much cooler than it would be where the milk is carried into the cellar with the animal heat in it.

Having thus fully described my invention, what I claim as new, and desire to secure by Letters Patent, is—

The within-described milk-cooler, consisting of the pan A, with central and side tubes, B B, connected at their lower ends, all as shown and described.

In testimony that I claim the foregoing I have hereunto set my hand this 9th day of March, 1870.

DAVID F. WOODWARD.

Witnesses:
 THOMAS N. SLAWSON,
 LEVI WHITING.